(12) United States Patent
Chen

(10) Patent No.: US 9,275,466 B2
(45) Date of Patent: Mar. 1, 2016

(54) IMAGE PROCESSING METHOD AND IMAGE PROCESSING APPARATUS FOR SEGMENTING IMAGE INTO REGIONS

(71) Applicant: CANON KABUSHIKI KAISHA, Tokyo (JP)

(72) Inventor: Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/508,928

(22) Filed: Oct. 7, 2014

(65) Prior Publication Data

US 2015/0098652 A1    Apr. 9, 2015

(30) Foreign Application Priority Data

Oct. 9, 2013    (JP) .................. 2013-212291

(51) Int. Cl.
*G06K 9/34* (2006.01)
*G06T 7/00* (2006.01)

(52) U.S. Cl.
CPC ..... *G06T 7/0081* (2013.01); *G06T 2207/20148* (2013.01)

(58) Field of Classification Search
None
See application file for complete search history.

(56) References Cited

U.S. PATENT DOCUMENTS

| | | | | |
|---|---|---|---|---|
| 5,751,450 | A | * | 5/1998 | Robinson .................. G01J 3/46 358/504 |
| 8,290,255 | B2 | * | 10/2012 | Naito ....................... G06K 9/38 382/164 |
| 2008/0298639 | A1 | * | 12/2008 | Tsunekawa ........... G06T 3/4007 382/107 |

FOREIGN PATENT DOCUMENTS

JP    5127738 B2    1/2013

OTHER PUBLICATIONS

Tse-Wei Chen, et al., "Photo Retrieval based on Spatial Layout with Hardware Acceleration for Mobile Devices," IEEE Transactions on Mobile Computing, vol. 10, No. 11. pp. 1646-1660, Nov. 2011.
Radhakrishna Achanta, et al., "SLIC Superpixels Compared to State-of-the-Art Superpixel Methods," IEEE Transactions on Pattern Analysis and Machine Intelligence, vol. 34, No. 11, pp. 2274-2282, Nov. 2012.
C. Y. Ren and I. Reid., "gSLIC: a real-time implementation of SLIC superpixel segmentation," Technical Report University of Oxford, Department of Engineering, 2011, (published before this application Oct. 2014).

\* cited by examiner

*Primary Examiner* — Eueng-Nan Yeh
(74) *Attorney, Agent, or Firm* — Canon USA, Inc. I.P. Division

(57) ABSTRACT

An image processing method includes, calculating a partial distance between a pixel of interest in an image and each of reference pixels, sequentially calculating a total distance between the pixel of interest and each of the plurality of the reference pixels based on the partial distance, determining a shortest total distance among the total distances that have been already calculated, in the sequential calculation of the total distance, and categorizing the pixel of interest based on the reference pixel corresponding to the shortest total distance, wherein, if the partial distance between the pixel of interest and a specific one of the reference pixels to be calculated is equal to or greater than the shortest total distance in the sequential calculation of the total distance, the calculation of the total distance between the pixel of interest and the specific one of the reference pixels to be calculated is omitted.

13 Claims, 14 Drawing Sheets

FIG.3
301 — ALREADY CALCULATED DISTANCE
302 — DISTANCE IN COORDINATE SPACE (FIRST PARTIAL DISTANCE) THAT HAS NOT YET BEEN CALCULATED
303 — SHORTEST TOTAL DISTANCE
304 — DISTANCE IN COLOR SPACE (SECOND PARTIAL DISTANCE) THAT HAS NOT YET BEEN CALCULATED
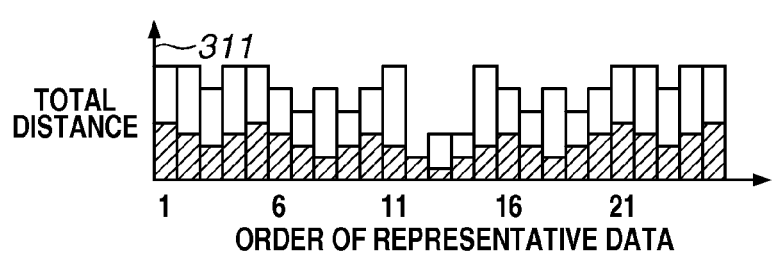
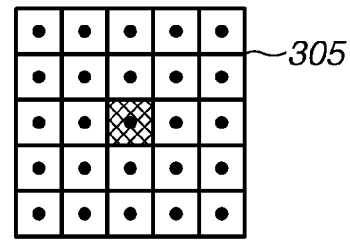
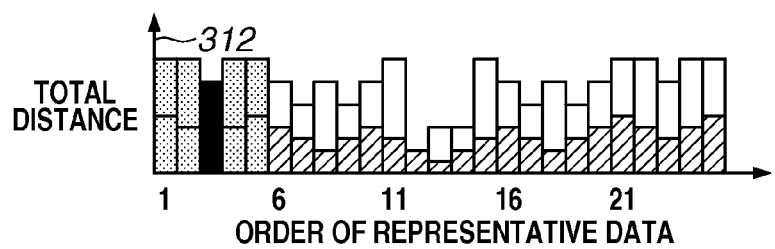
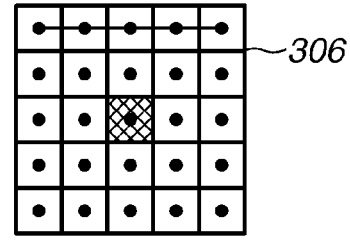
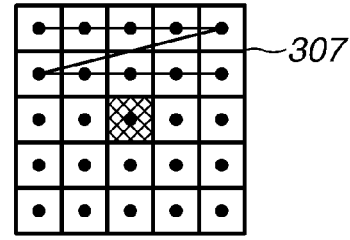
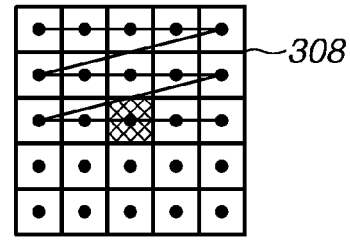
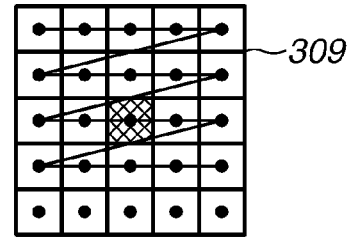
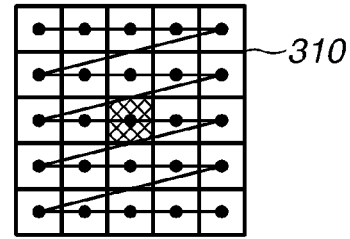

FIG.5

| 3 | 3 | 3 | 3 | 3 |
|---|---|---|---|---|
| 3 | 2 | 2 | 2 | 3 |
| 3 | 2 | 1 | 2 | 3 |
| 3 | 2 | 2 | 2 | 3 |
| 3 | 3 | 3 | 3 | 3 |

| 4 | 4 | 4 | 4 | 4 | 4 | 4 | 4 |
|---|---|---|---|---|---|---|---|
| 4 | 3 | 3 | 3 | 3 | 3 | 3 | 4 |
| 4 | 3 | 2 | 2 | 2 | 2 | 3 | 4 |
| 4 | 3 | 2 | 1 | ▨ | 1 | 2 | 3 | 4 |
| 4 | 3 | 2 | 1 | ▨ | 1 | 2 | 3 | 4 |
| 4 | 3 | 2 | 2 | 2 | 2 | 3 | 4 |
| 4 | 3 | 3 | 3 | 3 | 3 | 3 | 4 |
| 4 | 4 | 4 | 4 | 4 | 4 | 4 | 4 |

~1201

IMAGE PROCESSING METHOD AND IMAGE PROCESSING APPARATUS FOR SEGMENTING IMAGE INTO REGIONS

BACKGROUND OF THE INVENTION

1. Field of the Invention

The present invention relates to the region segmentation of an image, and in particular, relates to an image processing method and an image processing apparatus for segmenting an image into regions based on an attribute.

2. Description of the Related Art

As a technique for segmenting an image into a plurality of regions to have the same attribute such as color, texture, or coordinates, a region segmentation technique is used. The segmented regions allow an encoding process, image processing, and image recognition with respect to each segmented region. Thus, it becomes possible to implement new applications in various image processing apparatuses. In recent years, an embedded system often performs image processing, and therefore, a faster region segmentation technique for the embedded system is receiving attention.

Conventionally, various techniques are proposed regarding the region segmentation of an image. Some techniques for segmenting an image into regions by clustering pixels are disclosed in the publication of Japanese Patent No. 5127738 and the following dissertations 1, 2, and 3.
Dissertation 1: Tse-Wei Chen, et al., "Photo Retrieval based on Spatial Layout with Hardware Acceleration for Mobile Devices," IEEE Transactions on Mobile Computing, vol. 10, no. 11. pp. 1646-1660, November 2011.
Dissertation 2: Radhakrishna Achanta, et al., "SLIC Superpixels Compared to State-of-the-Art Superpixel Methods," IEEE Transactions on Pattern Analysis and Machine Intelligence, vol. 34, No. 11, pp. 2274-2282, November 2012.
Dissertation 3: C. Y. Ren and I. Reid., "gSLIC: a real-time implementation of SLIC superpixel segmentation," Technical Report University of Oxford, Department of Engineering, 2011.

The technique in the publication of Japanese Patent No. 5127738 is an algorithm for speeding up clustering. This technique first compares a processing target pixel with representative data in a cluster to which a neighboring pixel belongs, and if the distance in a color space between the processing target pixel and the representative data is small, causes the processing target pixel to go with the cluster to which the neighboring pixel belongs.

The technique in dissertation 1 implements a photograph search system based on the content of an image, using hardware for conventional "k-means clustering". This technique achieves the speeding up of the calculation of a distance, using hardware having a high degree of parallelism.

The technique in dissertation 2 generates small regions termed superpixels, using an algorithm termed "Simple Linear Iterative Clustering (SLIC)" for speeding up clustering. This technique limits the search range for the nearest representative data and therefore needs only a smaller amount of calculation than conventional "k-means clustering".

The technique in dissertation 3 is a technique for implementing a graphics processing unit (GPU) by improving the algorithm termed "SLIC" in dissertation 2. This technique limits the search range for the nearest representative data to 3×3 pixels to speed up the processing.

Clustering is a technique essential for image recognition and machine learning. As described above, a clustering algorithm is a technique often used in the region segmentation of an image. When clustering is performed, representative data in each cluster may be obtained, and a pixel (hereinafter referred to as "input data") may be assigned to the representative data. In this case, it is necessary to search for the nearest representative data by calculating the distance between the input data and each of a plurality of pieces of representative data.

If clustering is implemented in an embedded system, the degree of parallelism of hardware and the circuit size vary depending on the amount of calculation required to calculate the distance between the input data and each of the pieces of representative candidate data. To reduce the circuit size, various countermeasures to achieve a lightweight algorithm for clustering or reduce the amount of calculation are desired.

The publication of Japanese Patent No. 5127738 discusses a technique for comparing input data of interest with a cluster to which neighboring input data belongs, and discontinuing a calculation based on a threshold. In dissertation 1, the speeding up is achieved using hardware having a high degree of parallelism. In dissertations 2 and 3, the algorithm is sped up. However, even if the above conventional art is used, to cluster high resolution image data at high speed, the amount of calculation for calculating the distance is great.

SUMMARY OF THE INVENTION

According to an aspect of the present invention, an image processing method includes, calculating a partial distance between a pixel of interest in an image and each of a plurality of reference pixels, sequentially calculating a total distance between the pixel of interest and each of the plurality of the reference pixels based on the partial distance, determining a shortest total distance among the total distances that have been already calculated, in the sequential calculation of the total distance, and categorizing the pixel of interest based on the reference pixel corresponding to the shortest total distance, wherein, if the partial distance between the pixel of interest and a specific one of the reference pixels to be calculated is equal to or greater than the shortest total distance in the sequential calculation of the total distance, the calculation of the total distance between the pixel of interest and the specific one of the reference pixel to be calculated is omitted.

Further features of the present invention will become apparent from the following description of exemplary embodiments with reference to the attached drawings.

BRIEF DESCRIPTION OF THE DRAWINGS

FIG. 3 is a diagram illustrating the relationship between the calculation of the distance from each of pieces of representative candidate data and the order of calculation, according to the first exemplary embodiment.

FIG. 5 is a diagram illustrating the ranks in the calculation of the distance from each of pieces of representative candidate data, according to a second exemplary embodiment.

FIG. 12 is a diagram illustrating the ranks in the calculation of the distance from each of pieces of representative candidate data, according to another exemplary embodiment.

DESCRIPTION OF THE EMBODIMENTS

Various exemplary embodiments, features, and aspects of the invention will be described in detail below with reference to the drawings.

<Clustering for Region Segmentation>

Figure 1:
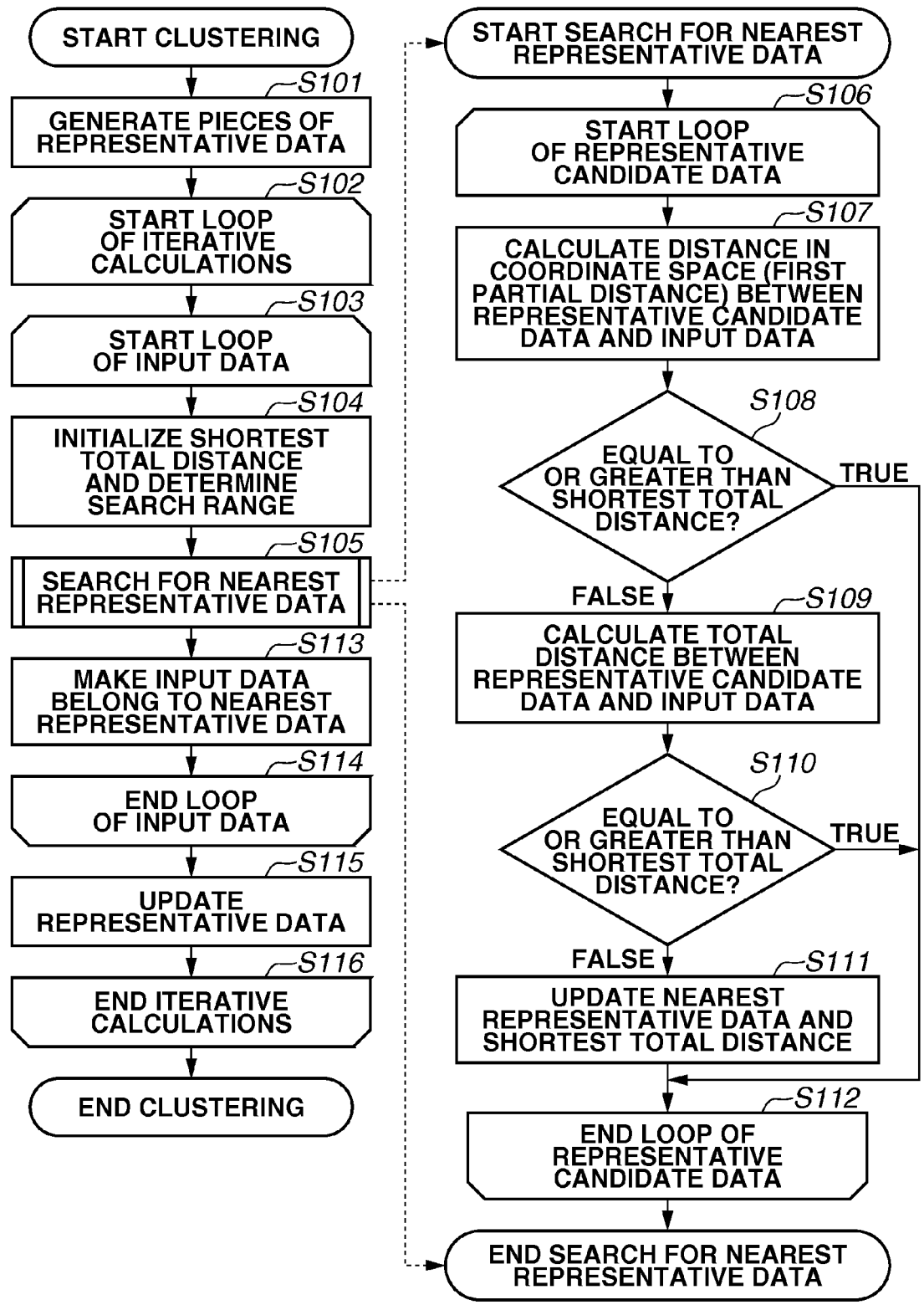
FIG. 1 is a flow chart regarding clustering according to a first exemplary embodiment.

FIG. 1 illustrates a flow chart according to a first exemplary embodiment. A central processing unit (CPU) 405 starts clustering and creates a five-dimensional vector $X_i$ for i-th input data, which serves as a partial image of interest within an image, as shown in a formula (1).

$$X_i = (X_{i,1}, X_{i,2}, X_{i,3}, X_{i,4}, X_{i,5}) \quad (1)$$

$X_{i,1}$ and $X_{i,2}$ represent a two-dimensional feature amount in a coordinate space and indicate vertical and horizontal coordinate values of the image. $X_{i,3}$, $X_{i,4}$, and $X_{i,5}$ represent a three-dimensional feature amount in a color space.

Figure 2:
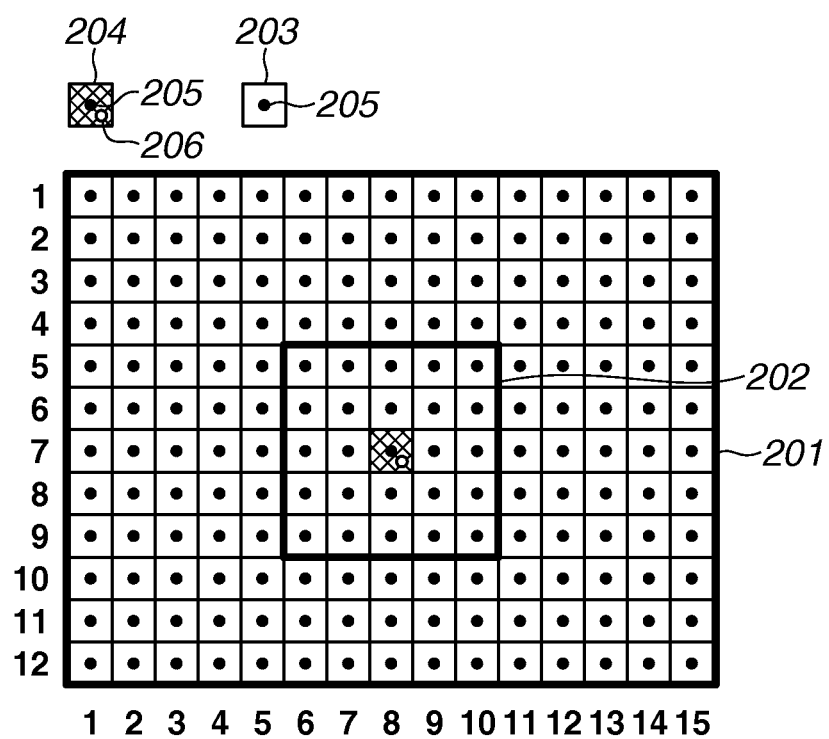
FIG. 2 is a diagram illustrating a search range for the nearest representative data according to the first exemplary embodiment.

In step S101, the CPU 405 generates pieces of representative data. Specifically, the CPU 405 segments an image 201 illustrated in FIG. 2 into blocks 203 in the coordinate space and places a piece of representative data 205, which serves as a reference partial image, in each of the blocks 203. The CPU 405 indexes all the pieces of representative data 205 and assigns index values to the pieces of representative data 205 based on the order of processing of the blocks or the order of positions of the blocks, thereby enabling control of the order of access. The numbers to the left of the image 201 and the numbers below the image 201 are vertical and horizontal indices of the pieces of representative data 205. The vertical and horizontal indices of the representative data 205 in a block 204 of a halftone dot pattern are 7 and 8, respectively. The vector of the feature amounts of the coordinate space and the color space of the selected input data is set to the vector of the representative data for the input data. For j-th representative data 205, a vector $C_j$ of the representative data is represented by a formula (2).

$$C_j = (C_{j,1}, C_{j,2}, C_{j,3}, C_{j,4}, C_{j,5}) \quad (2)$$

$C_{j,1}$ and $C_{j,2}$ represent a two-dimensional feature amount in the coordinate space and indicate vertical and horizontal coordinate values of the image. $C_{j,3}$, $C_{j,4}$, and $C_{j,5}$ represent a three-dimensional feature amount in the color space.

In step S102, the CPU 405 sets the maximum number of repetitions and starts the loop of iterative calculations.

In step S103, the CPU 405 starts the loop of input data. The CPU 405 controls an order i of input data $X_i$ in the image and repeats the processes of steps S104 to S113 to cluster all the pieces of input data.

In step S104, the CPU 405 initializes a shortest total distance and determines a search range. Specifically, the CPU 405 initializes a shortest total distance to the maximum value of a total distance described later and determines a search range for the representative candidate data based on the coordinate position of the input data. The representative candidate data for the input data refers to the representative data in a candidate cluster to which the input data is to be assigned (determined to belong).

An example of the representative data is described where the width and the height of a search range 202 are five blocks. The CPU 405 sets the search range 202 for the nearest representative data such that a block including input data of interest 206 is the center of the search range 202. In this case, the search range 202 includes 5×5 pieces of representative data in a coordinate neighborhood. The vertical indices of the representative data in the search range 202 are 5 to 9, and the horizontal indices are 6 to 10. The search range 202 is the same for all input data in the range of the block 204, including the input data of interest 206. The relationships between the position of the input data and the representative candidate data in the search range 202 are fixed first, so that even if the positions of the representative data have changed by repetitive processing, the indices of the representative data do not change.

In step S105, the CPU 405 searches for the nearest representative data, and step S105 includes steps S106 to S112. The details of step S105 will be described later. The nearest representative data for the input data refers to the representative data of which the total distance from the input data is the shortest, that is, the representative data nearest the input data in a metric space.

In step S113, based on the result of the search for the nearest representative data in step S105, the CPU 405 causes the input data to go with the cluster to which the nearest representative data belongs. That is, the CPU 405 assigns the same category as that of the nearest representative data to the input data.

In step S114, the CPU 405 determines whether all the pieces of input data have been processed. If the determination is affirmative, the processing proceeds to step S115. Then, the CPU 405 ends the loop of the input data. If the determination is negative, the processing returns to step S103. Then, the CPU 405 starts processing next input data.

In step S115, the CPU 405 calculates the mean vector of the vectors of the input data caused to go with the cluster, for each of the representative data. The CPU 405 sets the mean vector to a new vector $C_j$ of the representative data, thereby updating the representative data.

In step S116, the CPU 405 determines whether the number of iterative calculations has exceeded the maximum number of repetitions, or whether the results of the clustering have converged. If the number of iterative calculations has exceeded the maximum number of repetitions or the results of the clustering have converged, the CPU 405 ends the iterative calculations. If not, the processing returns to step S103. Then, the CPU 405 starts next iterative calculations. If the clustering has been completed, the CPU 405 outputs the results.

<Calculation of Distances by Separately Treating Distance in Color Space and Distance in Coordinate Space>

A description is given of steps S106 to S112, which are the details of step S105. The CPU 405 starts calculating the distance between the input data and each of the representative candidate data in the search range 202.

In step S106, the CPU 405 starts the loop of the representative candidate data. The CPU 405 controls an order j of representative candidate data $C_j$ and separately treats the distance in the color space and the distance in the coordinate space, thereby searching for all representative candidate data.

In step S107, the CPU 405 makes a first calculation to calculate a Euclidean distance $D_S$ in the coordinate space (a first partial distance) between the i-th input data and the j-th representative candidate data by a formula (3).

$$D_S(X_i,C_j)=(X_{i,1}-C_{j,1})^2+(X_{i,2}-C_{j,2})^2 \quad (3)$$

In step S108, the CPU 405 determines whether the first partial distance is equal to or greater than the shortest total distance. As will be described later, the total distance is greater than the first partial distance. Thus, if the first partial distance between certain data is equal to or greater than the current shortest total distance, the total distance between the certain data cannot be smaller than the shortest total distance. In this case (True in step S108), as for the j-th representative candidate data, the CPU 405 omits the calculations of the second partial distance and the total distance (step S109) and the update of the shortest total distance (steps S110 and S111), and the processing proceeds to step S112. If the first partial distance is less than the current shortest total distance (False in step S108), the processing proceeds to step S109.

In step S109, the CPU 405 calculates a Euclidean distance $D_C$ in the color space (a second partial distance) between the i-th input data and the j-th representative candidate data by a formula (4).

$$D_C(X_i,C_j)=(X_{i,3}-C_{j,3})^2+(X_{i,4}-C_{j,4})^2+(X_{i,5}-C_{j,5})^2 \quad (4)$$

As described above, the CPU 405 sequentially calculates the distances $D_S$ and $D_C$, and then makes a second calculation to calculate a distance D (the total distance), which is a linear combination of the first and second partial distances, by a formula (5).

$$D(X_i,C_j)=W\times D_S(X_i,C_j)+D_C(X_i,C_j) \quad (5)$$

W represents the weight of the first partial distance and is a value equal to or greater than 1. Thus, the total distance is greater than the first partial distance. As a substitute for the formula (5), the second partial distance may be positively weighted instead of the first partial distance. Also in this case, the total distance is greater than the first partial distance. In step S110, the CPU 405 determines whether the total distance calculated by the formula (5) is equal to or greater than the shortest total distance. If the total distance is equal to or greater than the shortest total distance (True in step S110), the CPU 405 skips step S111, and the processing proceeds to step S112. If the total distance is less than the shortest total distance (False in step S110), the processing proceeds to step S111.

In step S111, the CPU 405 updates the shortest total distance using the newly calculated total distance and changes the vector of the nearest representative data to C.

In step S112, the CPU 405 determines whether the comparisons with all representative candidate data have been completed. If the comparisons have been completed, the CPU 405 ends the search for the nearest representative data. If the comparisons have not been completed, the processing returns to step S106. Then, the CPU 405 starts calculating the distance from next representative candidate data.

<Example of Search for Nearest Representative Data>

FIG. 3 illustrates an example of the search for the nearest representative data according to the present exemplary embodiment. A halftone dot pattern 301 indicates an already calculated distance. A diagonal line pattern 302 indicates the distance in the coordinate space (the first partial distance) that has not yet been calculated. A black pattern 303 indicates the shortest total distance. A white pattern 304 indicates the distance in the color space (the second partial distance) that has not yet been calculated.

Search ranges 305 to 310 are examples of search ranges in which each of the width and the height is five pieces of representative data. Plots 311 to 316 are diagrams illustrating the relationship between an order of calculation of the distance from each of the representative candidate data and the total distance.

The search range 305 and the plot 311 represent the state before the search is started. The plot 312 illustrates the state when the search for the five pieces of representative candidate data in the first line from the top of the search range 306 has been completed. The total distance between each of five pieces of representative candidate data, namely the first to fifth pieces of representative candidate data, and the input data has been calculated, and the shortest total distance is the distance from the third representative candidate data.

The plot 313 illustrates the state when the search for the five pieces of representative candidate data in the second line from the top of the search range 307 has been completed. The total distance between each of five pieces of representative candidate data, namely the sixth to tenth pieces of representative candidate data, and the input data has been calculated, and the shortest total distance is the distance from the seventh representative candidate data.

The plot 314 illustrates the state when the search for the five pieces of representative candidate data in the third line from the top of the search range 308 has been completed. The total distance between each of three pieces of representative candidate data, namely the eleventh to thirteenth pieces of representative candidate data, and the input data has been calculated, and the shortest total distance is the distance from the twelfth representative candidate data. The first partial distance between each of the fourteenth and fifteenth pieces of representative candidate data and the input data exceeds the shortest total distance. Thus, it is not necessary to calculate the second partial distance.

The plot 315 illustrates the state when the search for the five pieces of representative candidate data in the fourth line from the top of the search range 309 has been completed. The first partial distance between each of these five pieces of representative candidate data and the input data exceeds the shortest total distance. Thus, it is not necessary to calculate the second partial distance. The shortest total distance is still the distance from the twelfth representative candidate data and therefore does not need to be updated.

The plot 316 illustrates the state when the search for the five pieces of representative candidate data in the fifth line from the top of the search range 310 has been completed. The first partial distance between each of these five pieces of representative candidate data and the input data exceeds the shortest total distance. Thus, it is not necessary to calculate the second partial distance. The shortest total distance is still the distance from the twelfth representative candidate data and therefore does not need to be updated. The search for all the pieces of representative candidate data is completed. Consequently, the nearest representative data is the twelfth representative candidate data, and the shortest total distance is the distance from the nearest representative data.

As described above, the distance in the color space and the distance in the coordinate space are separately treated, thereby enabling the omission of unnecessary calculations. This speeds up the processing.

<Exemplary Configuration of Data Processing Apparatus>

Figure 4:
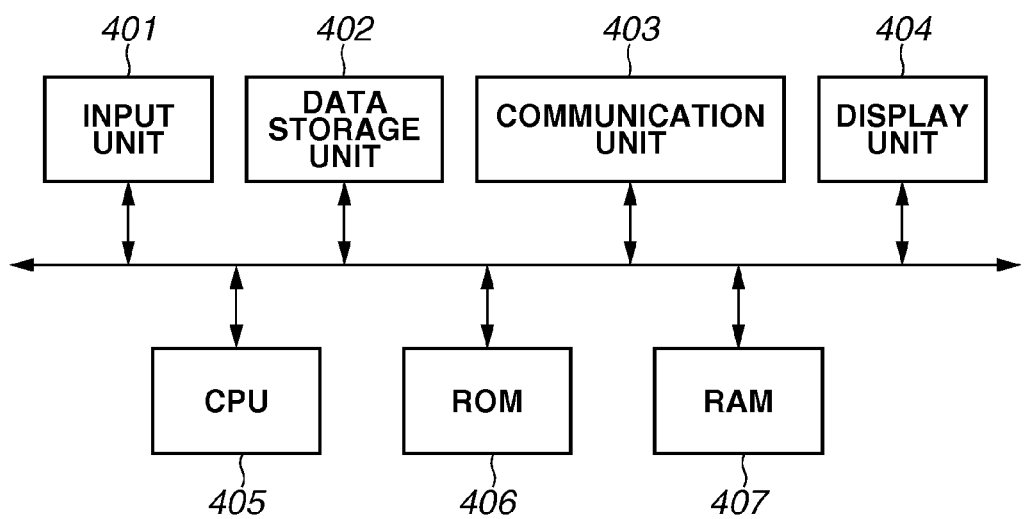
FIG. 4 is a block diagram illustrating the configuration of a data processing apparatus according to the first exemplary embodiment.

FIG. 4 is a block diagram illustrating an exemplary configuration of a data processing apparatus capable of achieving an image processing method according to the present invention.

A data storage unit 402 holds image data and normally includes a hard disk, a flexible disk, a Compact Disc Read-Only Memory (CD-ROM), a Compact Disc Recordable (CD-R), or a digital versatile disc (DVD). Alternatively, the data storage unit 402 may include a memory card, a CompactFlash (CF) card, a SmartMedia card, a Secure Digital (SD) card, a memory stick, an xD-Picture Card, or a Universal Serial Bus (USB) memory. The data storage unit 402 can save, as well as image data, a program and another type of data. Alternatively, a part of a random-access memory (RAM) 407 may be used as the data storage unit 402. Yet alternatively, it can also be virtually configured that the data storage unit 402 in a device to which the data processing apparatus is connected through the communication unit 403 may be used as a storage device.

A display unit 404 is a device for displaying an image before subjected to image processing or an image after subjected to image processing, or displaying an image of a graphical user interface (GUI). Generally, the display unit 404 is a cathode ray tube (CRT) display or a liquid crystal display. Alternatively, the display unit 404 may be an external display device to which the data processing apparatus is connected through a cable.

An input unit 401 is a device for inputting an instruction from a user and data and includes a keyboard and a pointing device. Examples of the pointing device include a mouse, a trackball, a trackpad, and a tablet. Alternatively, if the data processing apparatus is applied to a known device such as a digital camera apparatus or a printer, the input unit 401 may include buttons or a dial. Yet alternatively, a keyboard may be configured by software (a software keyboard) so that the user inputs text by operating buttons, a dial, or a pointing device as described above.

Alternatively, as implemented in a known touch screen device, the display unit 404 and the input unit 401 may be a single device. In this case, an input through a touch screen is treated as an input through the input unit 401.

The CPU 405 performs main processing (steps S101 to S116) according to the present exemplary embodiment and controls the operation of the entire apparatus. A read-only memory (ROM) 406 and the RAM 407 provide the CPU 405 with a program, data, and a work area required for the processing. If a program required for processing described later is stored in the data storage unit 402 or stored in the ROM 406, the program is once loaded into the RAM 407 and then executed. Alternatively, if the apparatus receives a program via the communication unit 403, the program is once recorded in the data storage unit 402 and then loaded into the RAM 407, or loaded into the RAM 407 directly from the communication unit 403, and then executed.

The CPU 405 reads image data written in the RAM 407, clusters the image data according to the present invention, and writes the result of the clustering process to the RAM 407 anew. The CPU 405 performs image recognition based on the result of the clustering. The result of the image recognition process performed by the CPU 405 is saved in the RAM 407 or transmitted to an external device via the communication unit 403.

In FIG. 4, the data processing apparatus is configured to include only one CPU (the CPU 405). Alternatively, the data processing apparatus may be configured to include a plurality of CPUs.

The communication unit 403 is an interface (I/F) for performing communication between devices. The communication unit 403 may perform the communication by a wired communication method using, for example, a known local area network, USB, the Institute of Electrical and Electronics Engineers (IEEE) 1284, IEEE 1394, or a telephone circuit. Alternatively, the communication unit 403 may perform the communication by a wireless communication method using infrared light (the Infrared Data Association (IrDA)), IEEE 802.11a, IEEE 802.11b, IEEE 802.11g, IEEE 802.11n, Bluetooth (registered trademark), or ultra-wideband (UWB).

FIG. 4 illustrates a diagram where the input unit 401, the data storage unit 402, and the display unit 404 are all included in a single apparatus. Alternatively, these components may be connected together through a communication channel using a known communication method, thereby collectively achieving such a configuration.

Although the system configuration includes various components other than the above components, the other components are not the focus of the present invention and therefore are not described.

<Variations of Present Exemplary Embodiment>

In the above exemplary embodiment, a description has been given of a two-dimensional feature amount in the coordinate space of a single image, namely $X_{i,1}$ and $X_{i,2}$, with which the feature amount of input data is represented by the formula (1). The feature amount of input data, however, is not limited to a two-dimensional feature amount in the coordinate space of a single image, and may be any dimensional feature amounts in a coordinate space and a time series space in processing a plurality of images.

A description has been given of a three-dimensional feature amount in the color space, namely $X_{i,3}$, $X_{i,4}$, and $X_{i,5}$, with which the feature amount of input data is represented by the formula (1). The feature amount of input data, however, is not limited to a color space, and may be a feature amount in a texture space or a combined space of texture and color. Further, the feature amount is not limited to three dimensions, and may be any dimensional feature amount.

An example has been described where the width and the height of the search range 202 are five pieces of representative data. The width of the search range, however, is not limited to five pieces of representative data. Alternatively, the search range may be any search range.

The formulas (3) and (4) have been described taking Euclidean distances in a coordinate space and a feature space such as a color space as examples. The present invention, however, is not limited to Euclidean distances. Alternatively, any distance scale may be used. In a second exemplary embodiment, only the differences from the first exemplary embodiment are described.

In the first exemplary embodiment, when the search for the nearest representative data is performed, the order of calculation of the distance from each of the representative candidate data is not taken into account. In contrast, in the second exemplary embodiment, the order of calculation of the distance from each of the representative candidate data is ranked. The ranks in the order of calculation of the distance from each of the representative candidate data are set in the order of maximum distance between the center coordinates of each block and the center coordinates of the search range. The smaller the maximum distance, the higher the rank of the representative candidate data as a calculation target.

A maximum distance $D_0$ is calculated by a formula (6).

$$D_0(S_i, B_j) = \max(|S_{i,1} - B_{j,1}|, |S_{i,2} - B_{j,2}|) \quad (6)$$

$S_{i,1}$ and $S_{i,2}$ represent a two-dimensional feature amount of a center $S_i$ of an i-th search range in the coordinate space. $B_{j,1}$ and $B_{j,2}$ represent a two-dimensional feature amount of a center $B_j$ of a j-th block in the coordinate space. The rank in the order of calculation of the distance from the representative data $C_j$ is determined based on the center $B_j$ of the block. Unlike the representative data $C_j$, the coordinates of the center $B_j$ of the block do not change by iterative calculations.

Figure 5:
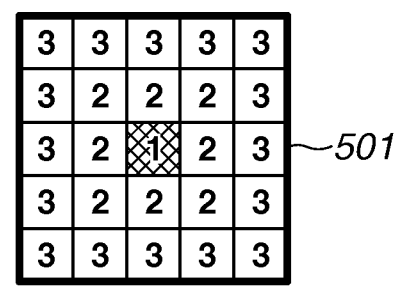

In FIG. 5, ranks 501 in the order of calculation of the distance from each of the representative candidate data correspond to the search range 202. The numbers in the blocks indicate the ranks in the order of calculation of the distance from each of the representative candidate data when the search is performed. The smaller the number, the higher the rank. The search is started from the representative candidate data having a rank of 1, and the search for any representative candidate data having a rank of 2 is performed next. If the search for all representative candidate data having a rank of 2 has been completed, the search for any representative candidate data having a rank of 3 is performed.

The present exemplary embodiment is different from the first exemplary embodiment in the order of calculation of the distance in steps S106 to S112.

<Example of Spiral Search for Nearest Representative Data>

Figure 6:
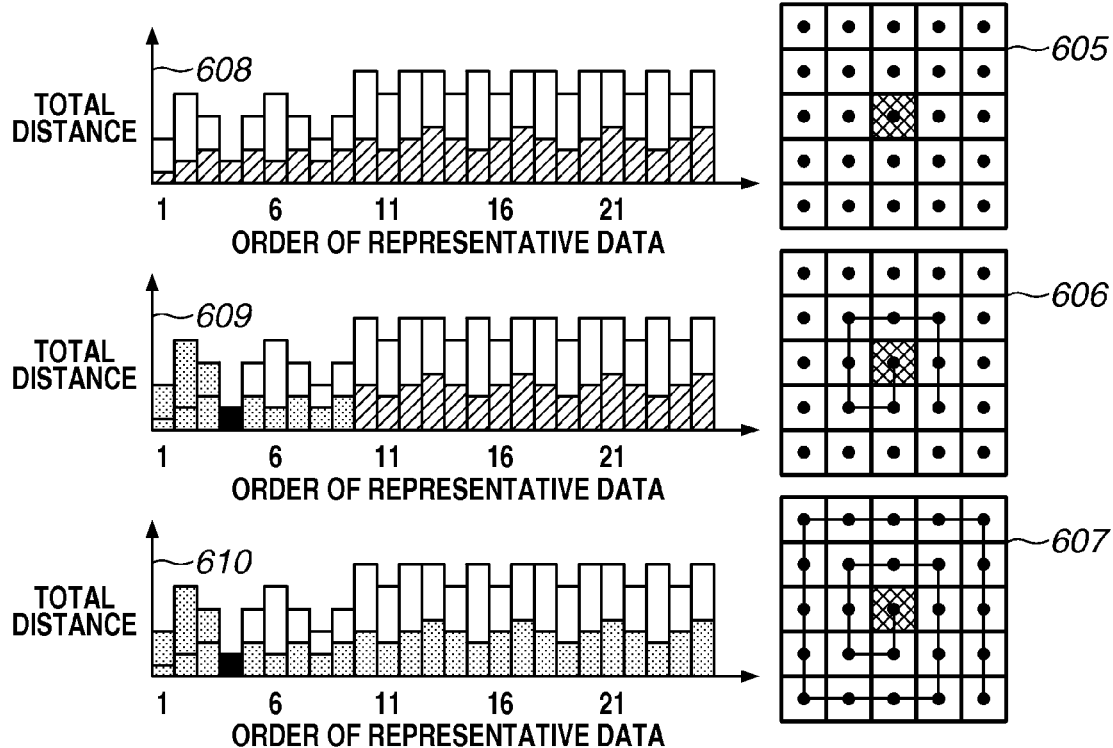
FIG. 6 is a diagram illustrating the relationship between the calculation of the distance from each of pieces of representative candidate data and the order of calculation, according to the second exemplary embodiment.

FIG. 6 illustrates an example of the search for the nearest representative data according to the present exemplary embodiment. A halftone dot pattern 601 means an already calculated distance. A diagonal line pattern 602 means the distance in the coordinate space (the first partial distance) that has not yet been calculated. A black pattern 603 means the shortest total distance. A white pattern 604 means the distance in the color space (the second partial distance) that has not yet been calculated.

Search ranges 605 to 607 are examples of search ranges in which the width and the height are five pieces of representative data. Plots 608 to 610 are diagrams illustrating the relationship between the order of calculation of the distance from each representative candidate data and the total distance.

The search range 605 and the plot 608 represent the state before the search is started. The search for one piece of representative candidate data of which the rank 501 is 1 is performed, and then, the search for eight pieces of representative candidate data of which the rank 501 is 2 is performed. The plot 609 illustrates the state when a line has been drawn on the representative data for which the search has been performed in the search range 606, and the search for the representative candidate data has been completed. The total distance between four pieces of representative candidate data, namely the first to fourth representative candidate data, and the input data has been calculated, and the shortest total distance is the distance from the fourth representative candidate data. The first partial distance between each of the fifth to ninth pieces of representative candidate data and the input data exceeds the shortest total distance. Thus, it is not necessary to calculate the second partial distance.

Next, the search for the 16 remaining pieces of representative candidate data of which the rank 501 is 3 is performed. The plot 610 illustrates the state when a line has been drawn on the representative data for which the search has been performed in the search range 607, and the search for the representative candidate data has been completed. The first partial distance between each of the 16 pieces of representative candidate data and the input data exceeds the shortest total distance. Thus, it is not necessary to calculate the second partial distance. The shortest total distance is still the distance from the fourth representative candidate data and therefore does not need to be updated.

As described above, the order of calculation of the distance from each representative candidate data are ranked, thereby performing a spiral search for the nearest representative data. It is possible to find the nearest representative data earlier than FIG. 4. This reduces the number of calculations of the second partial distance and therefore speeds up the processing.

In a third exemplary embodiment, only the differences from the first exemplary embodiment are described.

Figure 7:
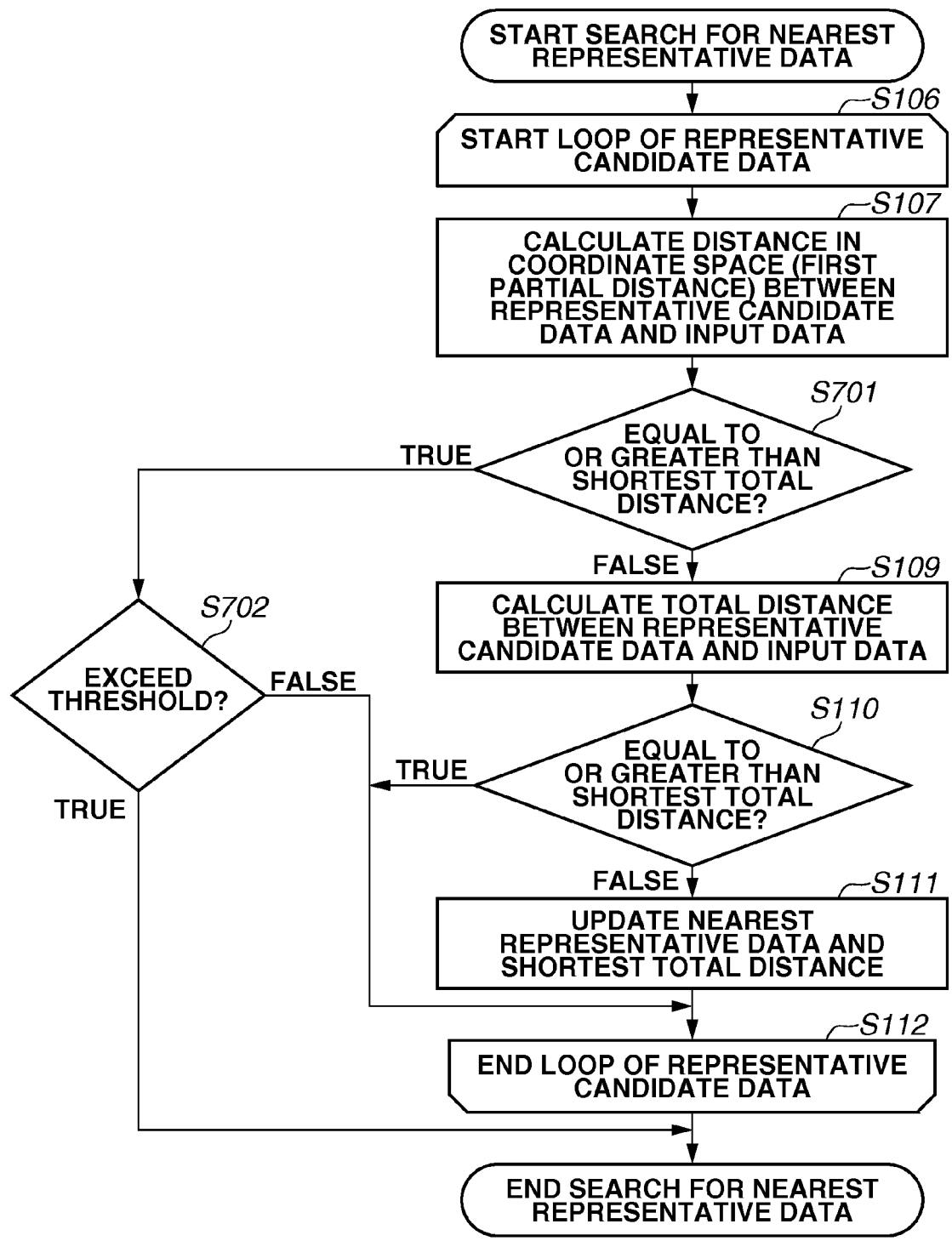
FIG. 7 is a flow chart regarding clustering according to a third exemplary embodiment.

FIG. 7 illustrates a flow chart according to the third exemplary embodiment. In step S701, the CPU 405 determines whether the first partial distance calculated in step S107 is equal to or greater than the shortest total distance. If the first partial distance is equal to or greater than the shortest total distance (True in step S701), the CPU 405 skips steps S109 to S111, and the processing proceeds to step S702. If the first partial distance is less than the shortest total distance (False in step S701), the processing proceeds to step S109.

In step S702, the CPU 405 determines whether the first partial distance calculated in step S701 exceeds a threshold. If the first partial distance exceeds the threshold (True in step S702), the CPU 405 omits the processing on the remaining pieces of representative data from this point forward and ends the search for the nearest representative data. If the first partial distance is less than or equal to the threshold (False in step S702), the processing proceeds to step S112.

<Example of Discontinuing Calculation of Distance in Spiral Search for Nearest Representative Data>

Figure 8:
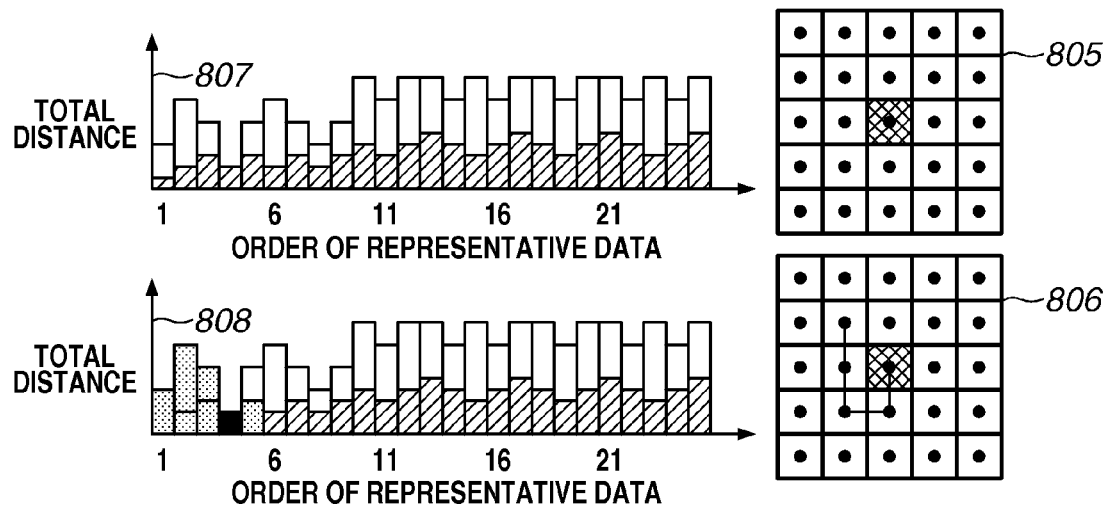
FIG. 8 is a diagram illustrating the relationship between the calculation of the distance from each of pieces of representative candidate data and the order of calculation, according to the third exemplary embodiment.

FIG. 8 illustrates an example of the search for representative data in the present exemplary embodiment. A halftone dot pattern 801 indicates an already calculated distance. A diagonal line pattern 802 indicates the distance in the coordinate space (the first partial distance) that has not yet been calculated. A black pattern 803 indicates the shortest total distance. A white pattern 804 indicates the distance in the color space (the second partial distance) that has not yet been calculated.

Search ranges 805 and 806 are examples of search ranges in which each of the width and the height is five pieces of representative data. Plots 807 and 808 are diagrams illustrating the relationship between the order of calculation of the distance from each of representative candidate data and the total distance.

The search range 805 and the plot 807 represent the state before the search is started. The search for the representative candidate data of which the rank 501 is 1 is performed, and then, the search for the four pieces of representative candidate data of which the rank 501 is 2 is performed. The plot 808 illustrates the state when a line has been drawn on the representative data for which the search has been performed in the search range 806, and the search for the representative candidate data has been completed. The total distance between each of four pieces of representative candidate data, namely the first to fourth representative candidate data, and the input data has been calculated, and the shortest total distance is the distance from the fourth representative candidate data. In this case, if the first partial distance between the fifth representative candidate data and the input data is equal to or greater than the shortest total distance and exceeds the threshold, it is not necessary to calculate the second partial distance. Further, it is not necessary to search for the 20 remaining pieces of representative candidate data, either.

As described above, if the first partial distance is sufficiently great, the calculation of the distance is discontinued based on a threshold. This speeds up the processing.

The threshold in step S702 is not limited to a fixed value, and may dynamically change. As an example of the dynamic change, a threshold $T_j$, which is proportional to the shortest total distance, is calculated by a formula (7).

$$T_j = \min_{1 \leq m < j} D(X_i, C_m) \times F \quad (7)$$

$X_i$ represents the vector of the i-th input data. $C_m$ represents the vector of m-th representative candidate data. F represents the weight of the shortest total distance, which is determined in advance.

In a fourth exemplary embodiment, only the differences from the first exemplary embodiment are described.

Figure 9:
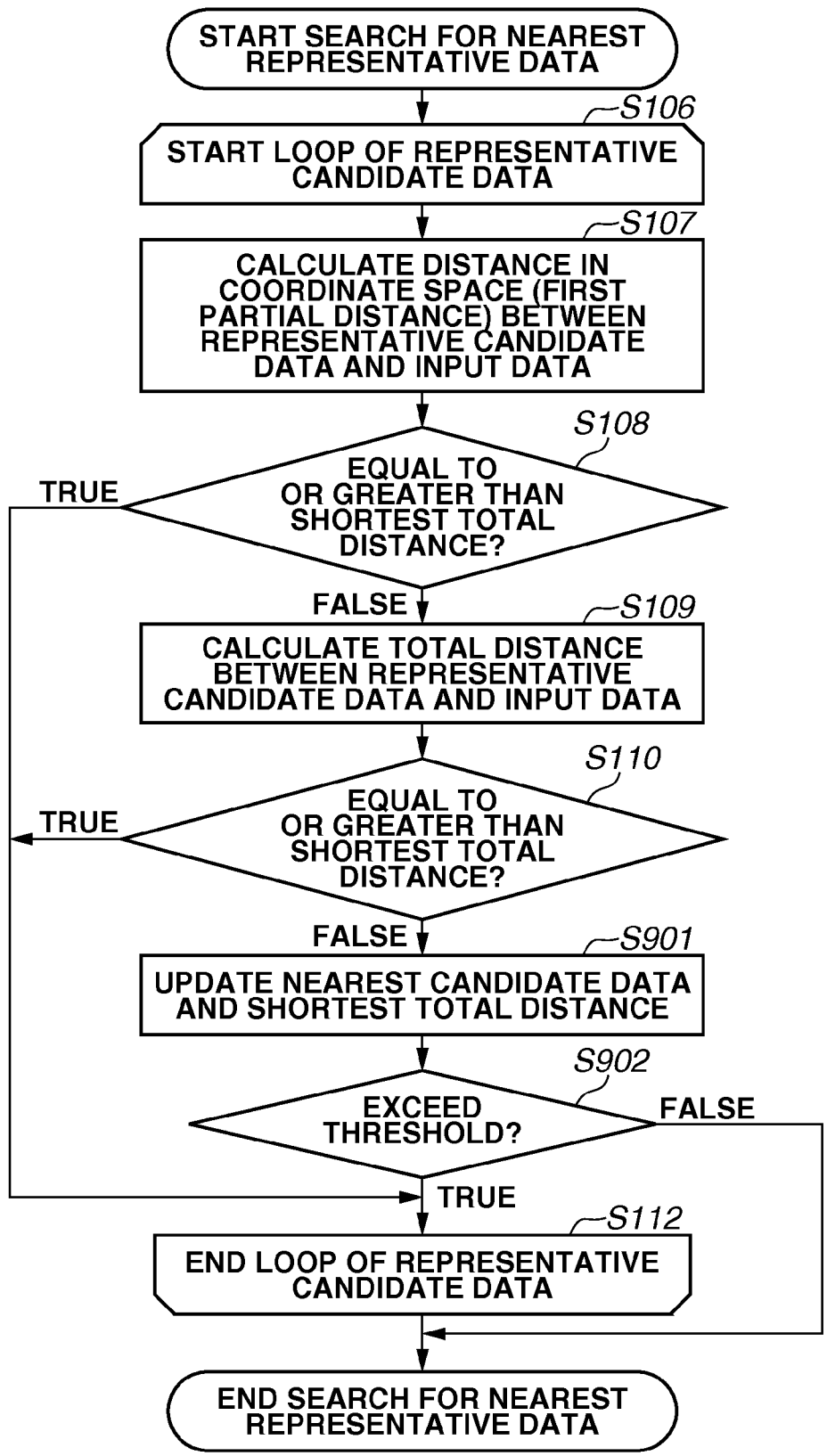
FIG. 9 is a flow chart regarding clustering according to a fourth exemplary embodiment.

FIG. 9 illustrates a flow chart according to the fourth exemplary embodiment. In step S901, the CPU 405 updates the shortest total distance to the total distance calculated in step S109 and changes the vector of the nearest representative data to $C_j$.

In step S902, the CPU 405 determines whether the updated shortest total distance is less than or equal to a threshold. If the updated shortest total distance exceeds the threshold (True in step S902), the processing proceeds to step S112. If the updated shortest total distance is less than or equal to the threshold (False in step S902), the CPU 405 ends the search for the nearest candidate data.

<Example of Discontinuing Calculation of Distance in Spiral Search for Nearest Candidate Data>

Figure 10:
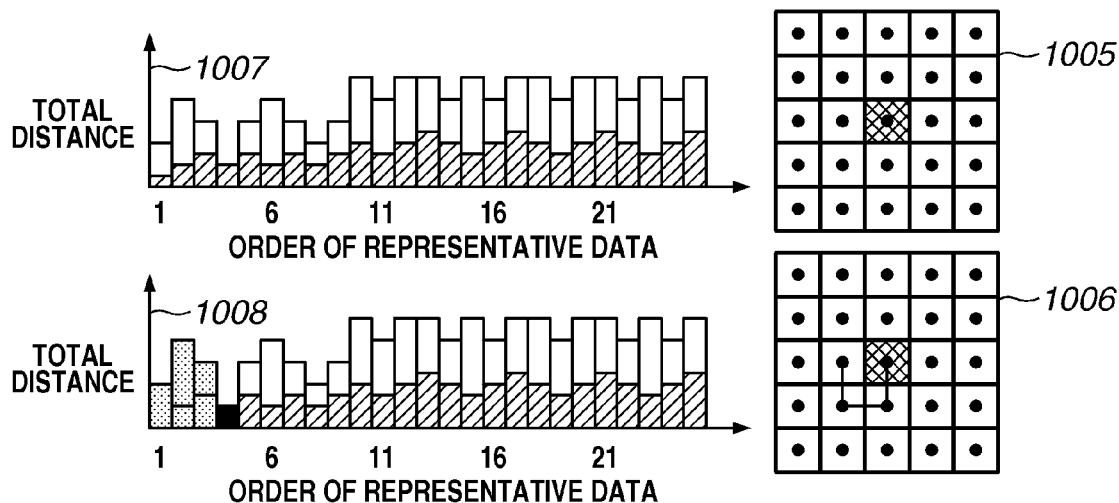
FIG. 10 is a diagram illustrating the relationship between the calculation of the distance from each of pieces of representative candidate data and the order of calculation, according to a fourth exemplary embodiment.

FIG. 10 illustrates an example of the search for the nearest candidate data in the present exemplary embodiment. A halftone dot pattern 1001 indicates an already calculated distance. A diagonal line pattern 1002 indicates the distance in the coordinate space (the first partial distance) that has not yet been calculated. A black pattern 1003 indicates the shortest total distance. A white pattern 1004 indicates the distance in the color space (the second partial distance) that has not yet been calculated.

Search ranges 1005 and 1006 are examples of search ranges in which the width and the height are five pieces of representative data. Plots 1007 and 1008 are diagrams illustrating the relationship between the order of calculation of the distance from each of the representative candidate data and the total distance.

The search range 1005 and the plot 1007 represent the state before the search is started. The search for one piece of representative candidate data of which the rank 501 is 1 is performed, and then, the search for the three pieces of representative candidate data of which the rank 501 is 2 is performed. The plot 1008 illustrates the state when a line has been drawn on the representative data for which the search has been performed in the search range 1006, and the search for the representative candidate data has been completed. The total distance between each of four pieces of representative candidate data, namely the first to fourth representative candidate data, and the input data has been calculated, and the shortest total distance is the distance from the fourth representative candidate data. In this case, if the shortest total distance is less than or equal to the threshold, it is not necessary to search for the 21 remaining pieces of representative candidate data.

As described above, if the total distance is sufficiently small, the calculation of the distance is discontinued based on a threshold. This speeds up the processing.

The threshold in step S902 is not limited to a fixed value, and may dynamically change. Further, the order of calculation of the distance from each of the representative candidate data may be ranked as described in the second exemplary embodiment.

Other Exemplary Embodiments

<First Exemplary Embodiment in Case Where Width and Height of Search Range are Even Number of Pieces of Representative Data>

In the first exemplary embodiment, an example has been described where the width and the height of the search range are an odd number of pieces of representative data. The width and the height, however, are not limited to odd numbers of pieces of representative data. The present invention is similarly applicable to the case where the width and the height of a search range are each an even number of pieces of representative data.

Figure 11:
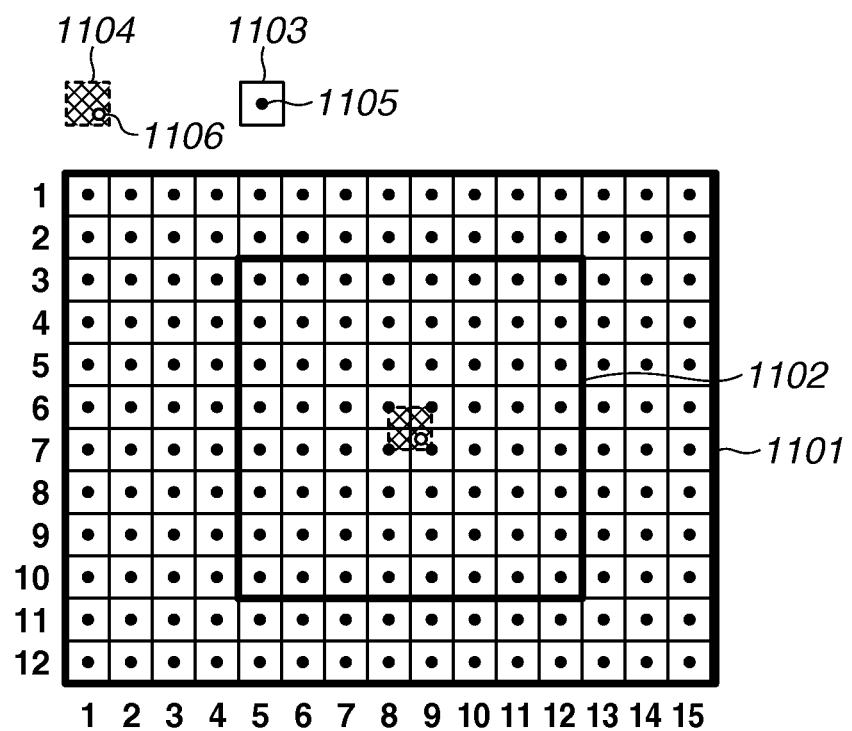
FIG. 11 is a diagram illustrating a search range for the nearest representative data according to another exemplary embodiment.

FIG. 11 illustrates an exemplary embodiment where the width and the height of a search range are each an even number of pieces of representative data. As described in the first exemplary embodiment, the CPU 405 segments an image 1101 illustrated in FIG. 11 into blocks 1103 in the coordinate space and places a piece of representative data 1105 in each of the blocks 1103. The CPU 405 indexes all representative data 1105 and assigns index values to the pieces of representative data 1105 based on an order of processing of the blocks or an order of positions of the blocks, thereby controlling the order of access. The numbers to the left of the image 1101 and the numbers below the image 1101 are vertical and horizontal indices of the representative data 1105. The vector of the feature amounts in the coordinate space and the color space of the selected input data is set to be the vector of the representative data for the input data.

The CPU 405 sets a search range 1102 for representative candidate data such that the corners of the blocks nearest input data of interest 1106 is the center of the search range 1102. The vertical indices of the pieces of representative data in the search range 1102 are 3 to 10, and the horizontal indices are 5 to 12. The search range 1102 is the same for all pieces of input data in the range of a rectangle 1104, including the input data of interest 1106.

An example has been described where the width and the height of the search range 1102 are eight pieces of representative data. The width of the search range, however, is not limited to eight pieces of representative data. Alternatively, the search range may be any search range.

<Second to Fourth Exemplary Embodiments in Case Where Width and Height of Search Range are Even Number of Pieces of Representative Data>

In the second to fourth exemplary embodiments, examples have been described where the width and the height of the search range are an odd number of pieces of representative data. The width and the height, however, are not limited to odd numbers of pieces of representative data. The present invention is similarly applicable to the case where the width and the height of a search range are an even number of pieces of representative data.

In FIG. 12, ranks 1201 in the order of calculation of the distance from each representative candidate data correspond to the search range 1102. The numbers within the blocks mean the ranks of the representative candidate data when the search is performed. The smaller the number, the higher the rank. The search is started from the representative candidate data having a rank of 1, and the search for any representative candidate data having a rank of 2 is performed next. If the search for all representative candidate data having a rank of 2 has been completed, the search for any representative candidate data having a rank of 3 is performed. If the search for all representative candidate data having a rank of 3 has been completed, the search for any representative candidate data having a rank of 4 is performed.

An example has been described where the width and the height of the search range 1102 are eight pieces of representative data. The width of the search range, however, is not limited to eight pieces of representative data. Alternatively, the search range may be any search range.

<Second to Fourth Exemplary Embodiments in Case of Ranks in Order of Distance Calculation Based on Order of Manhattan Distance>

In the second to fourth exemplary embodiments, a description has been given of examples of the ranking in the order of the distance calculation based on the order of maximum distance. The present invention, however, is not limited to the order of maximum distance, but is similarly applicable to the ranking in the order of the distance calculation based on the order of Manhattan distance.

Figure 13:
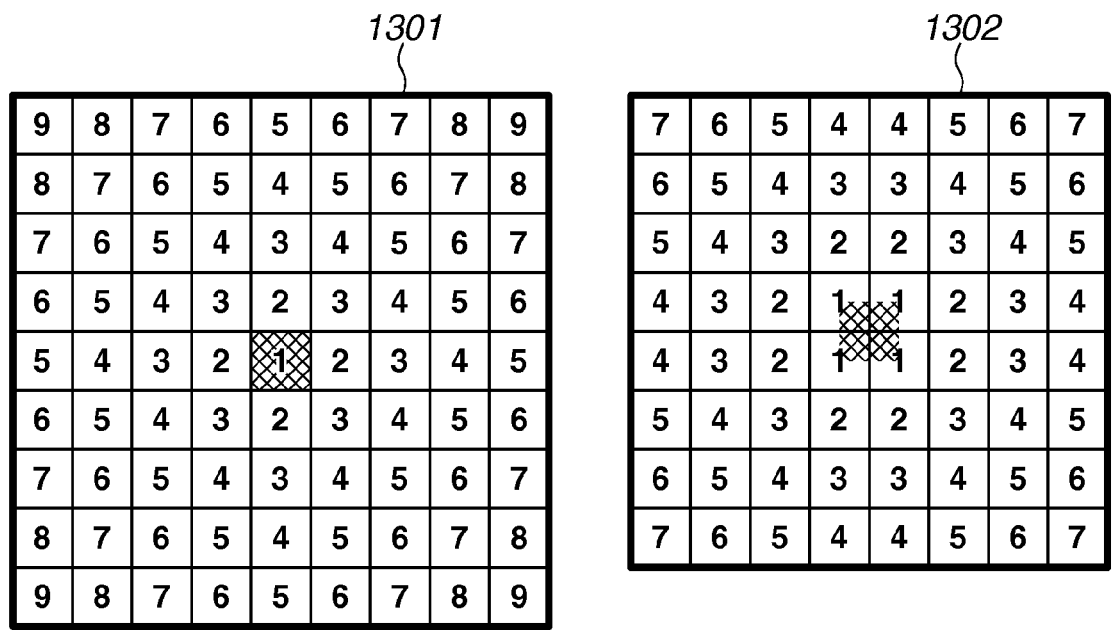
FIG. 13 is a diagram illustrating the ranks in the calculation of the distance from each of pieces of representative candidate data, according to another exemplary embodiment.

FIG. 13 illustrates the ranks in the order of calculation of the distance from each representative candidate data. Ranks 1301 are examples in the case where the width and the height of a search range are an odd number of pieces of representative data. Ranks 1302 are examples in the case where the width and the height of a search range are an even number of pieces of representative data. The order of calculation of the distance from each representative candidate data are ranked based on the order of Manhattan distance between the coordinate center of each block and the coordinate center of the search range. The smaller the Manhattan distance, the higher the rank.

A Manhattan distance $D_1$ is calculated by a formula (8).

$$D_1(S_i,B_j)=|S_{i,1}-B_{j,1}|+|S_{i,2}-B_{j,2}| \quad (8)$$

$S_{i,1}$ and $S_{i,2}$ represent a two-dimensional feature amount of a center $S_i$ of an i-th search range in the coordinate space. $B_{j,1}$ and $B_{j,2}$ represent a two-dimensional feature amount of a center $B_j$ of a j-th block in the coordinate space. The rank in the order of calculation of the distance from the representative data $C_j$ is determined based on the center $B_j$ of the block. Unlike the representative data $C_j$, the coordinates of the center $B_j$ of the block do not change by iterative calculations.

An example has been described where the width and the height of the search range 1301 are nine pieces of representative data, and the width and the height of the search range 1302 are eight pieces of representative data. Alternatively, the search ranges may be any search ranges.

<Second to Fourth Exemplary Embodiments in Case of Ranks in Order of Distance Calculation Based on Order of Any Distance>

In the above exemplary embodiment and the second exemplary embodiment, a description has been given of examples of the ranking in the order of the distance calculation based on the order of Manhattan distance and the order of maximum distance. The present invention, however, is not limited to the order of Manhattan distance and the order of maximum distance, but is similarly applicable to the ranking in the order of the distance calculation based on the order of Euclidean distance.

Figure 14:
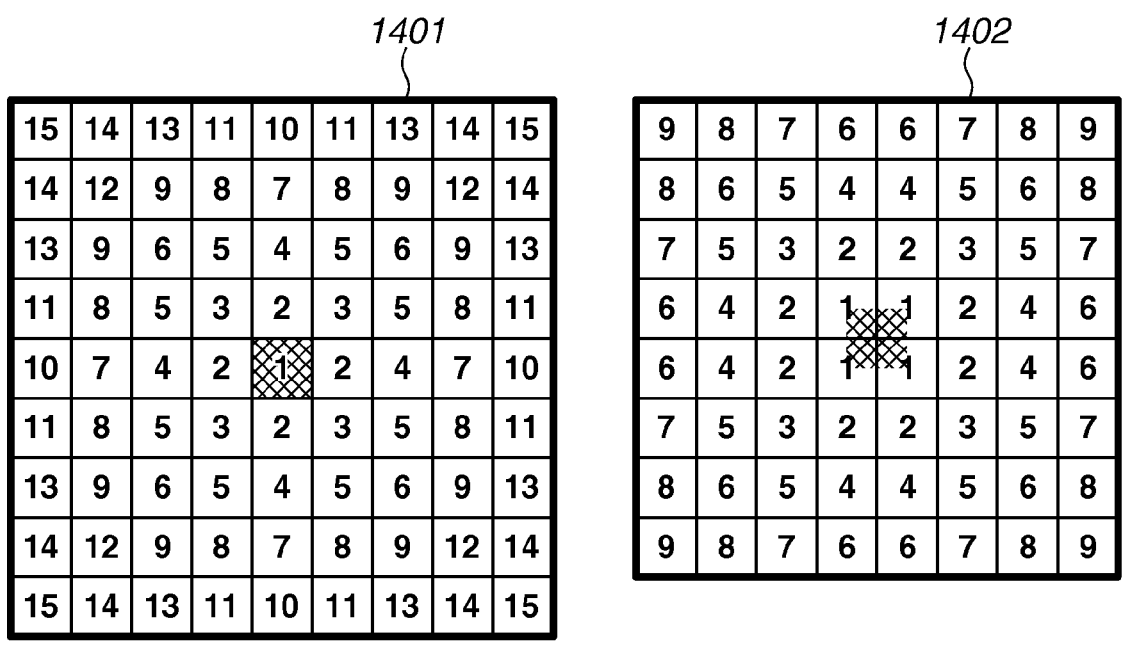
FIG. 14 is a diagram illustrating the ranks in the calculation of the distance from each of pieces of representative candidate data, according to another exemplary embodiment.

FIG. 14 illustrates the ranks in the order of calculation of the distance from each representative candidate data. Ranks 1401 are examples in the case where the width and the height of a search range are an odd number of pieces of representative data. Ranks 1402 are examples in the case where the width and the height of a search range are an even number of pieces of representative data. The order of calculation of the distance from each representative candidate data are ranked based on the order of Euclidean distance between the coordinate center of each block and the coordinate center of the search range. The smaller the Euclidean distance, the higher the rank.

A Euclidean distance $D_2$ is calculated by a formula (9).

$$D_2(S_i,B_j)=(S_{i,1}-B_{j,1})^2+(S_{i,2}-B_{j,2})^2 \quad (9)$$

$S_{i,1}$ and $S_{i,2}$ represent a two-dimensional feature amount of a center $S_i$ of an i-th search range in the coordinate space. $B_{j,1}$ and $B_{j,2}$ represent a two-dimensional feature amount of a center $B_j$ of a j-th block in the coordinate space. The rank in the order of calculation of the distance from the representative data $C_j$ is determined based on the center $B_j$ of the block. Unlike the representative data $C_j$, the coordinates of the center $B_j$ of the block do not change by iterative calculations.

An example has been described where the width and the height of the search range 1401 are nine pieces of representative data, and the width and the height of the search range 1402 are eight pieces of representative data. Alternatively, the search ranges may be any search ranges.

A description has been given of an example of the ranking in the order of the distance calculation based on the order of Euclidean distance. The present invention, however, is not limited to the order of Euclidean distance, but is similarly applicable to the ranking in the order of the distance calculation based on the order of any distance.

<First to Fourth Exemplary Embodiments in Case Where First Partial Distance is Other than Distance in Coordinate Space>

In the first to fourth exemplary embodiments, examples have been described where the first partial distance is a distance in a coordinate space. The present invention, however, is not limited to a coordinate space. Alternatively, the first partial distance may be a distance other than a distance in a coordinate space (a distance in a color space, a distance in a texture space, or a distance in a time series space of a plurality of images).

<First to Fourth Exemplary Embodiments in Case Where First Partial Distance is Part of Distance>

In the first to fourth exemplary embodiments, examples have been described where the first partial distance is a distance in a coordinate space. The present invention, however, is not limited to a coordinate space. Alternatively, the first partial distance may be a distance in part of a coordinate space or a distance other than that of part of coordinates.

<First to Fourth Exemplary Embodiments in Case of Block Segmentation in Any Space>

In the first to fourth exemplary embodiments, examples have been described where input data is segmented into blocks in a coordinate space. The present invention, however, is not limited to a coordinate space. Alternatively, input data may be segmented into blocks in any metric space.

According to each of the above exemplary embodiments, if the present invention is carried out in a embedded system, the amount of calculation is reduced, and the bandwidth for access to a memory for storing representative data is also reduced. If an application-specific integrated circuit is designed, the speeding up of clustering, the reduction in the circuit size, and the reduction in the power consumption can be realized.

According to the above exemplary embodiments, the reduction in the amount of calculation for clustering an image and the speeding up of the processing can be realized.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-212291 filed Oct. 9, 2013, which is hereby incorporated by reference herein in its entirety.

What is claimed is:

1. An image processing method comprising:
calculating a partial distance between a pixel of interest in an image and each of a plurality of reference pixels;
sequentially calculating a total distance between the pixel of interest and each of the plurality of the reference pixels based on the partial distance;
determining a shortest total distance among the total distances that have been already calculated, in the sequential calculation of the total distance; and
categorizing the pixel of interest based on the reference pixel corresponding to the shortest total distance,
wherein, if the partial distance between the pixel of interest and a specific one of the reference pixels to be calculated is equal to or greater than the shortest total distance in the sequential calculation of the total distance, the calculation of the total distance between the pixel of interest and the specific one of the reference pixels to be calculated is omitted.

2. The image processing method according to claim 1, wherein, if the partial distance between the pixel of interest and any one of the reference pixels to be calculated exceeds a threshold in the sequential calculation of the total distance, the calculation of the total distance between the pixel of interest and the remaining reference pixels is omitted.

3. The image processing method according to claim 2, wherein the threshold is set based on the shortest total distance.

4. The image processing method according to claim 1, wherein the plurality of reference pixels is ranked in ascending order of the partial distance, and the total distance is calculated according to the ranks of the plurality of reference pixels in the calculation of total distance.

5. The image processing method according to claim 1, wherein the partial distance includes a distance in a coordinate space.

6. The image processing method according to claim 1, wherein the total distance is based on a plurality of partial distances.

7. The image processing method according to claim 6, wherein the total distance is a linear combination of the plurality of partial distances.

8. The image processing method according to claim 1, wherein the plurality of partial distances includes a distance in a coordinate space and any of a distance in a time series space of a plurality of images, a distance in a color space, and a distance in a texture space.

9. The image processing method according to claim 1, wherein the image is segmented into a plurality of blocks within a metric space, and one of the reference pixels is placed in each block, so that an index value is assigned to each block, and the partial distance is calculated based on the index value.

10. The image processing method according to claim 9, wherein in the calculation of partial distance between the pixel of interest and each of the plurality of reference pixels, an order of calculation of the partial distance is determined based on a position of the block corresponding to the reference pixel and a position of the block including the pixel of interest.

11. The image processing method according to claim 1, wherein, if the shortest total distance is less than or equal to a threshold in the sequential calculation of the total distance, the calculation of the total distance between the pixel of interest and the remaining reference pixels is omitted.

12. A non-transitory computer-readable storage medium storing a program for causing a computer to execute the image processing method according to claim 1.

13. An image processing apparatus comprising:
a first calculation unit configured to calculate a partial distance between a pixel of interest in an image and each of a plurality of reference pixels;
a second calculation unit configured to sequentially calculate a total distance between the pixel of interest and each of the plurality of the reference pixels based on the partial distance;
a determination unit configured to determine a shortest total distance among the total distances that have been already calculated, in the sequential calculation by the second calculation unit; and
a categorization unit configured to categorize the pixel of interest based on the reference pixel corresponding to the shortest total distance,
wherein, if the partial distance between the pixel of interest and a specific one of the reference pixels to be calculated is equal to or greater than the shortest total distance in the sequential calculation by the second calculation unit, the calculation of the total distance between the pixel of interest and the specific one of the reference pixels to be calculated is omitted.

* * * * *